US011970350B2

(12) United States Patent
Tsujimura

(10) Patent No.: US 11,970,350 B2
(45) Date of Patent: Apr. 30, 2024

(54) MEDIUM UNIT

(71) Applicant: Brother Kogyo Kabushiki Kaisha, Nagoya (JP)

(72) Inventor: Yuki Tsujimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 104 days.

(21) Appl. No.: 17/211,939

(22) Filed: Mar. 25, 2021

(65) Prior Publication Data

US 2021/0300706 A1 Sep. 30, 2021

(30) Foreign Application Priority Data

Mar. 31, 2020 (JP) ................................ 2020-061969

(51) Int. Cl.
*B65H 16/02* (2006.01)
*B41J 11/58* (2006.01)

(52) U.S. Cl.
CPC ............ *B65H 16/028* (2013.01); *B41J 11/58* (2013.01)

(58) Field of Classification Search
None
See application file for complete search history.

(56) References Cited

U.S. PATENT DOCUMENTS 3,778,842 A * 12/1973 Saito ...................... B41J 25/304 346/136
4,761,663 A * 8/1988 Piatt ........................ B41J 11/58 D18/49
5,072,306 A 12/1991 Matsumoto et al.
5,230,576 A * 7/1993 Sone ...................... B41J 15/042 400/613
6,749,353 B1 * 6/2004 Favre ..................... B41J 15/042 400/613
8,702,330 B2 * 4/2014 Inoue ....................... B41J 15/16 400/613
2011/0205322 A1 * 8/2011 Maekawa ........... B41J 11/0045 347/104
2011/0216140 A1 * 9/2011 Yamaya ................ B41J 15/042 242/590
2012/0062678 A1 * 3/2012 Tsuji ...................... B41J 11/706 347/104
2021/0300091 A1 * 9/2021 Yamaguchi ............ B41J 15/044
2022/0204290 A1 * 6/2022 Tatematsu .............. B65H 16/10
2022/0204299 A1 * 6/2022 Yamaguchi ............ B65H 20/02
2022/0234852 A1 * 7/2022 Miyase .................. B65H 35/06
2023/0065393 A1 * 3/2023 Tatematsu ................ B41J 15/04

FOREIGN PATENT DOCUMENTS

JP H02-264559 A 10/1990
JP H05-333634 A 12/1993
JP H07-187495 A 7/1995
JP 2003-012167 A 1/2003

* cited by examiner

*Primary Examiner* — William A. Rivera
(74) *Attorney, Agent, or Firm* — Merchant & Gould P.C.

(57) ABSTRACT

A medium unit, having a tray, a casing, and a pullback assembly, is provided. The tray stores a roll of medium, in which a continuous medium is rolled. The casing supports the tray detachably attached thereto. The pullback assembly pushes the continuous medium from a lower side to pull a loose end of the continuous medium unrolled from the roll of medium in conjunction with a detaching action to move the tray to detach from the casing in an orthogonal direction intersecting orthogonally with a rotation axis of the roll of medium.

8 Claims, 8 Drawing Sheets

MEDIUM UNIT

CROSS REFERENCE TO RELATED APPLICATION

This application claims priority from Japanese Patent Application No. 2020-061969, filed on Mar. 31, 2020, the entire subject matter of which is incorporated herein by reference.

BACKGROUND

Technical Field

An aspect of the present disclosure is related to a medium unit capable of storing a roll of medium.

Related Art

An image processing apparatus having two (2) feeder trays that may store rolled continuous media, e.g., sheet rolls, therein is known. The feeder trays may be arranged vertically in tiers and drawn out of a body of the image processing apparatus. Each of the feeder trays may have a feed roller to convey the sheet unrolled from the roll, a feeder path to guide the sheet being conveyed by the feed roller, and a cutter to cut the sheet conveyed in the feeder path.

SUMMARY

The feeder trays, each having the feeder roller and the cutter, may complicate the configuration of the image processing apparatus. In this regard, the configuration of each feeder tray may be simplified by, for example, arranging the feeder roller and the cutter on a casing, which may be a part of the body of the image processing apparatus or may be an extension casing attachable to the body of the image processing apparatus, so that the feeder trays may be restrained from having the feed rollers or the cutters.

However, according to this suggested configuration, a problem as below may be predicted. That is, with a cutting assembly including a cutter arranged on the casing, when the sheet unrolled form the roll is cut by the cutter, a loose end of the remaining sheet may be placed at a position largely displaced from the feeder tray. With the loose end of the sheet roll placed at the displaced position, when the feeder tray is moved to be drawn out to be detached from the casing and moved back to be attached to the casing, the loose end of the sheet roll may collide with the casing or a part of the casing, e.g., the feed roller, and may bend or deform. Thus, deformation of the loose end of the sheet roll due to the detaching and attaching action of the feeder tray may cause a feeding error in the image processing apparatus.

The present disclosure is advantageous in that a medium unit, which may restrain a feeding error of a roll of medium due to an attaching or detaching action of the feeder tray, is provided.

According to an aspect of the present disclosure, a medium unit, having a tray, a casing, and a pullback assembly, is provided. The tray is configured to store a roll of medium, in which a continuous medium is rolled. The casing is configured to support the tray detachably attached thereto. The pullback assembly is configured to push the continuous medium from a lower side to pull a loose end of the continuous medium unrolled from the roll of medium in conjunction with a detaching action to move the tray to detach from the casing in an orthogonal direction intersecting orthogonally with a rotation axis of the roll of medium.

BRIEF DESCRIPTION OF THE ACCOMPANYING DRAWINGS

Figure 7A:
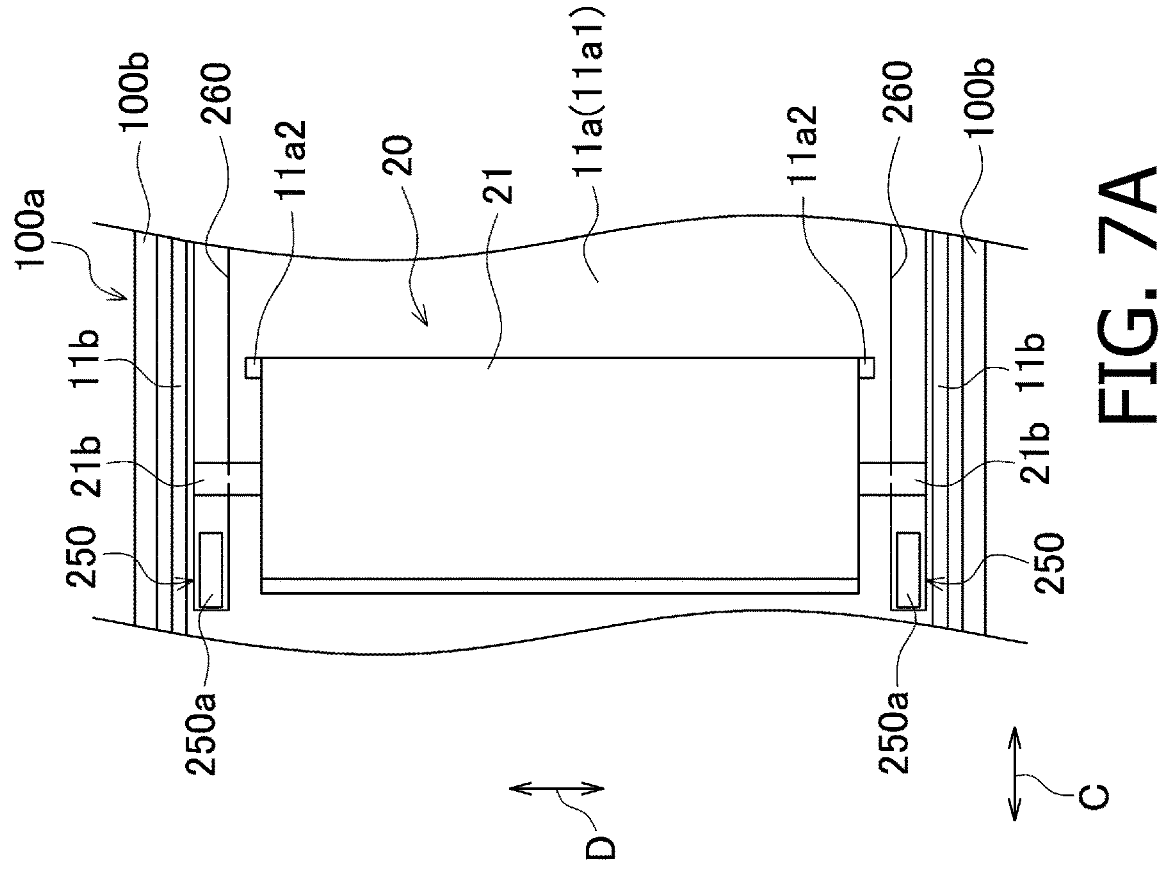
Figure 7B:
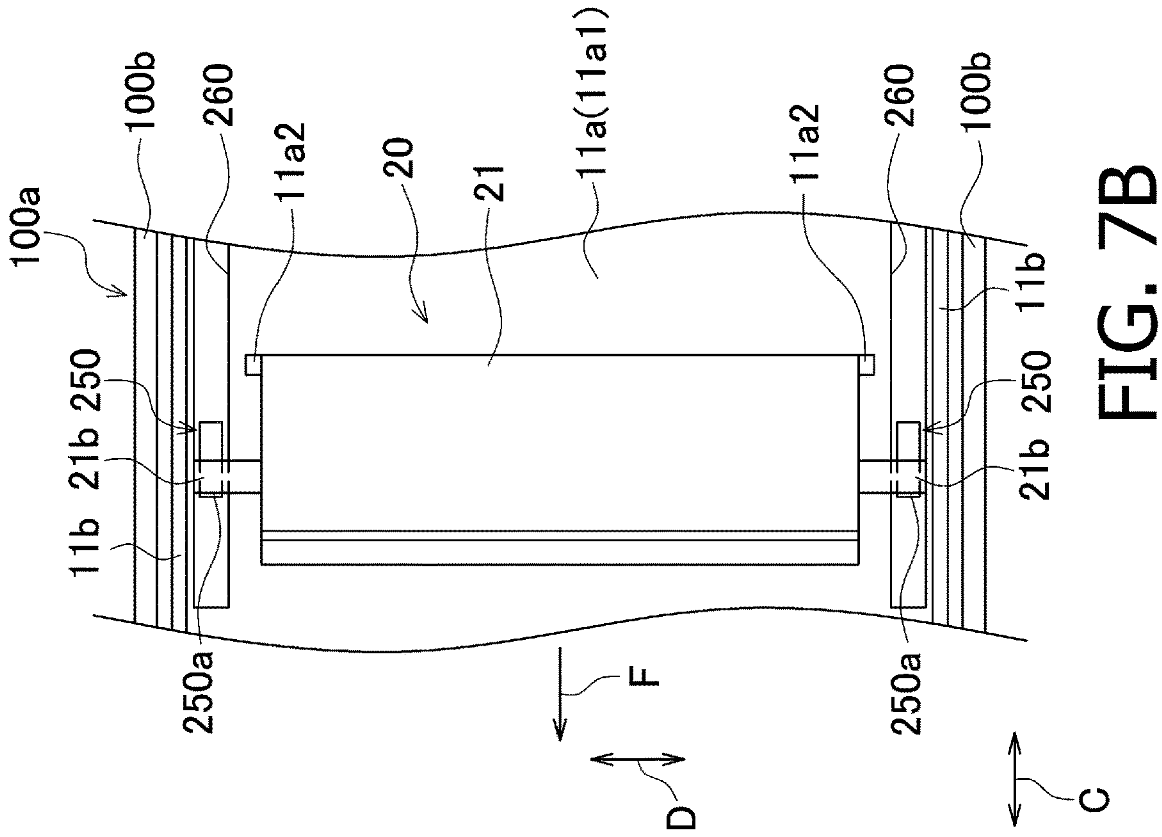

FIG. 7A is a partial plan view of a pullback assembly in a feeder unit according to a second modified example of the embodiment of the present disclosure when a feeder cassette is being attached to a casing. FIG. 7B is a partial plan view of the pullback assembly in the feeder unit according to the second modified example of the embodiment of the present disclosure when the feeder cassette is being detached from the casing.

Figure 8B:
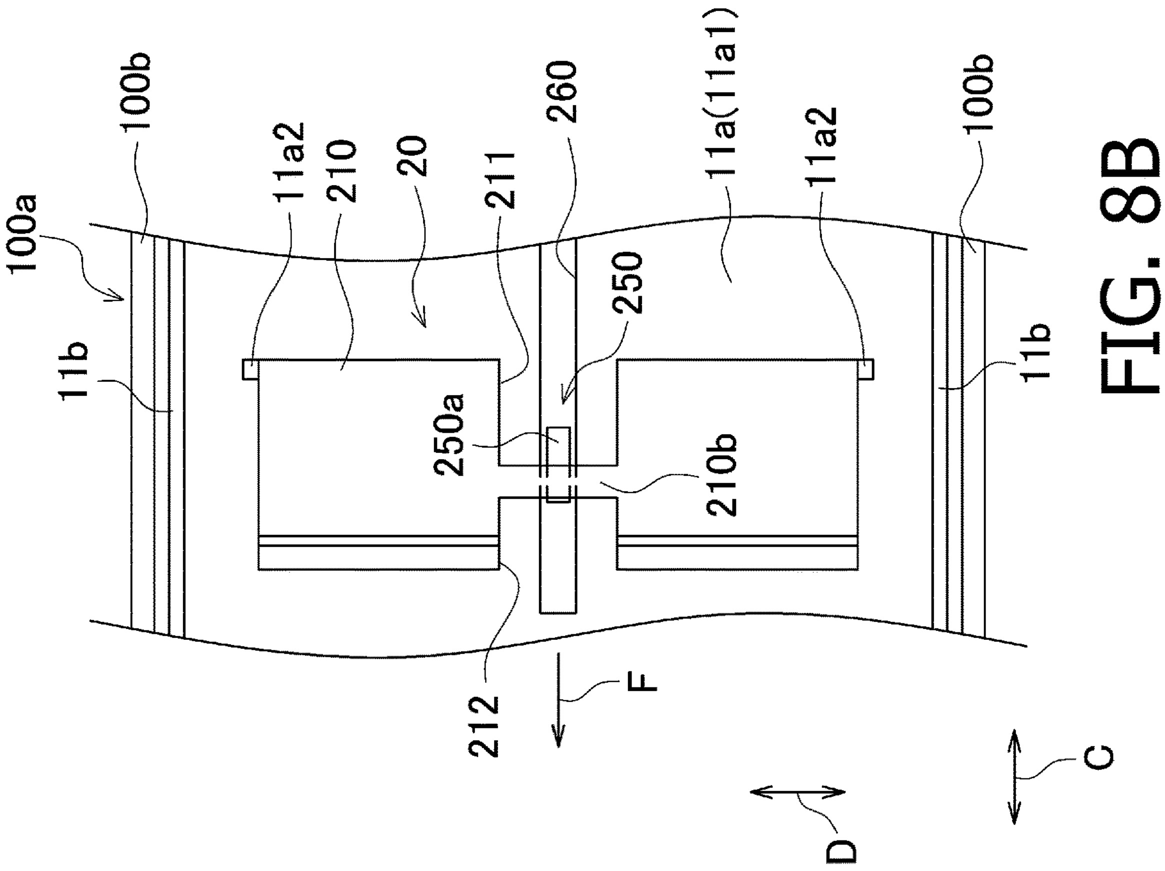
Figure 8A:
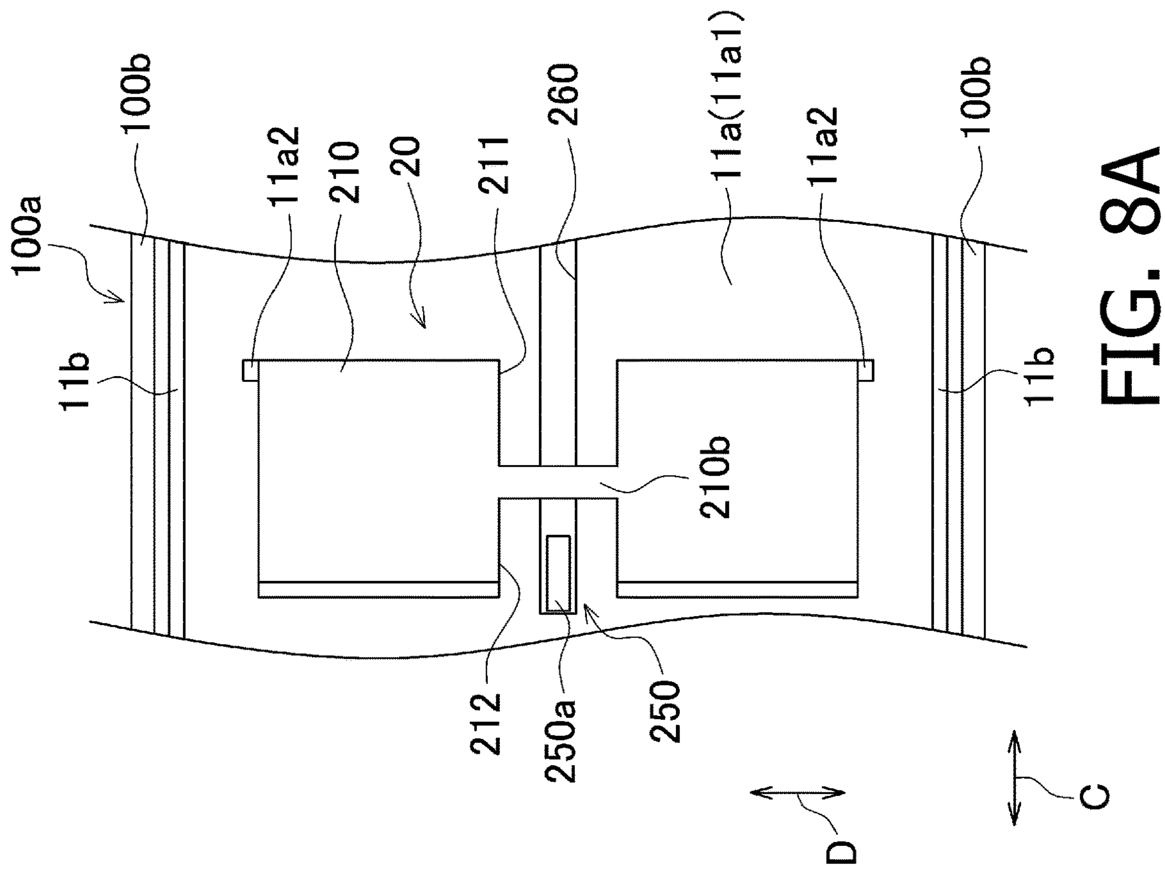

FIG. 8A is a partial plan view of a pullback assembly in a feeder unit according to a third modified example of the embodiment of the present disclosure when a feeder cassette is being attached to a casing. FIG. 8B is a partial plan view of the pullback assembly in the feeder unit according to the third modified example of the embodiment of the present disclosure when the feeder cassette is being detached from the casing.

DETAILED DESCRIPTION

Hereinafter, a printer 100 having a feeder unit K according the embodiment of the present disclosure will be described with reference to the accompanying drawings.

Figure 1:
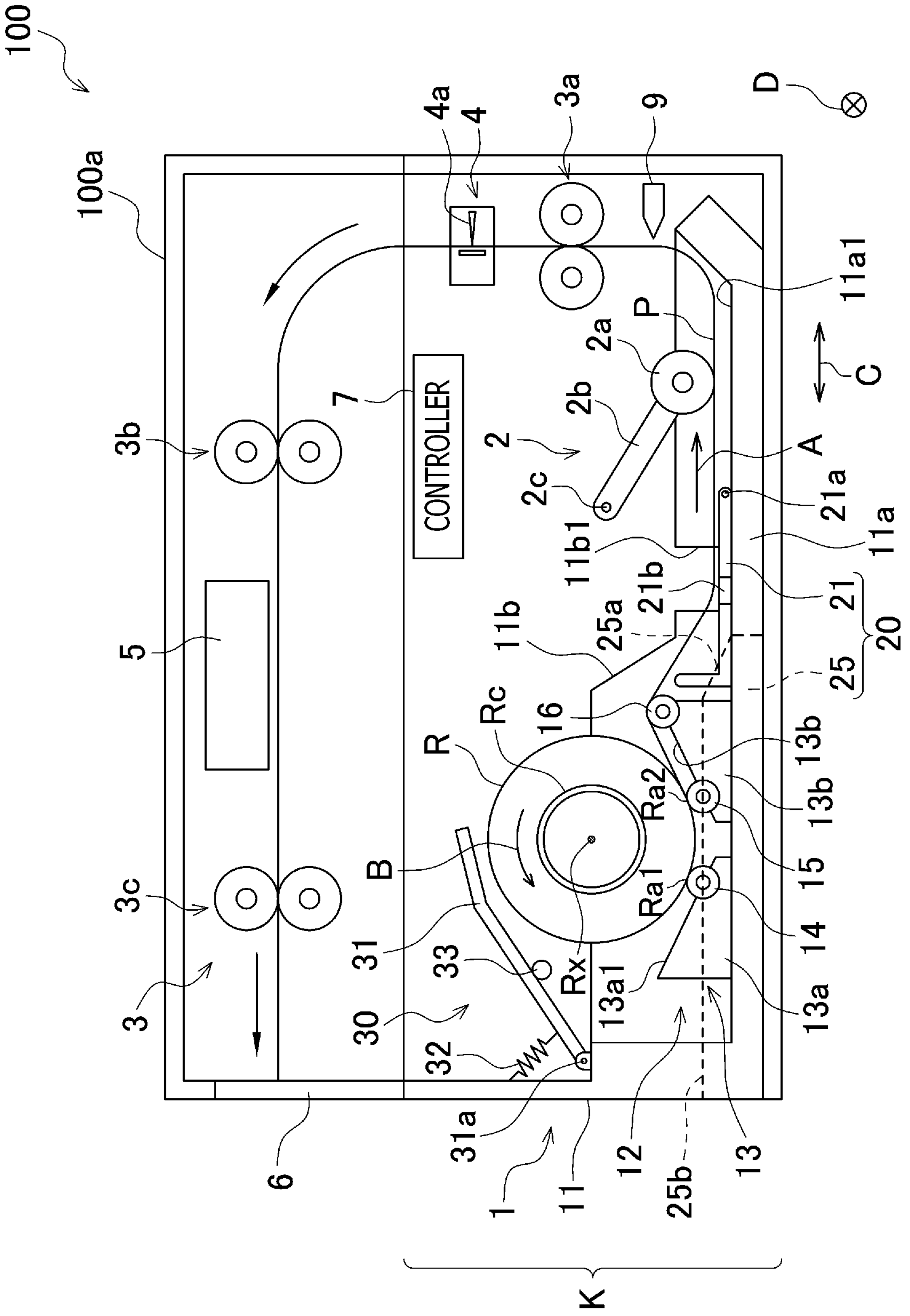
FIG. 1 is an illustrative cross-sectional view of a printer with a feeder unit according to an embodiment of the present disclosure.

The printer 100 includes, as shown in FIG. 1, a casing 100*a*, a feeder cassette 1, a feeding device 2, a conveying device 3, a cutting device 4, a recording device 5 including a recording head, an ejection tray 6, a controller 7, a pullback assembly 20, and a restrictive assembly 30. The feeder cassette 1 is attachable to and detachable from a lower part of the casing 100*a*. The ejection tray 6 forms an upper part of a side wall of the casing 100*a* and is movable with respect to the casing 100*a* to be open and closed.

The feeder cassette 1 may store a sheet roll R, which may be an elongated sheet of paper rolled around an outer circumferential surface of a tubular member Rc, e.g., a paper tube. The sheet roll R may be set in the feeder cassette 1 in a posture such that an axial direction D thereof, which extends along a direction of a rotation axis Rx being a central axis of the tubular member Rc, intersects orthogonally with a vertical direction. The axial direction D intersects orthogonally with a plane at the cross section shown in FIG. 1. The axial direction D of the rotation axis Rx may coincide with a widthwise direction of the sheet P. The sheet P may be unrolled, or drawn outward, from the sheet roll R to be conveyed in a conveying direction A away from the sheet roll R. Meanwhile, when the sheet P is conveyed in the conveying direction A, the sheet roll R may rotate in a rotating direction B to unroll the sheet P.

The feeder cassette 1 includes, as shown in FIG. 1, a tray 11 and a supporting section 12, which may support the sheet roll R rotatably. In particular, the supporting section may support the sheet roll R at a lower part of an outer circumferential surface. The tray 11 may have a form of a top-open box, in which the sheet roll R may be stored. The supporting section 12 includes a supporting base 13 and three (3) rollers 14-16.

Figure 2:
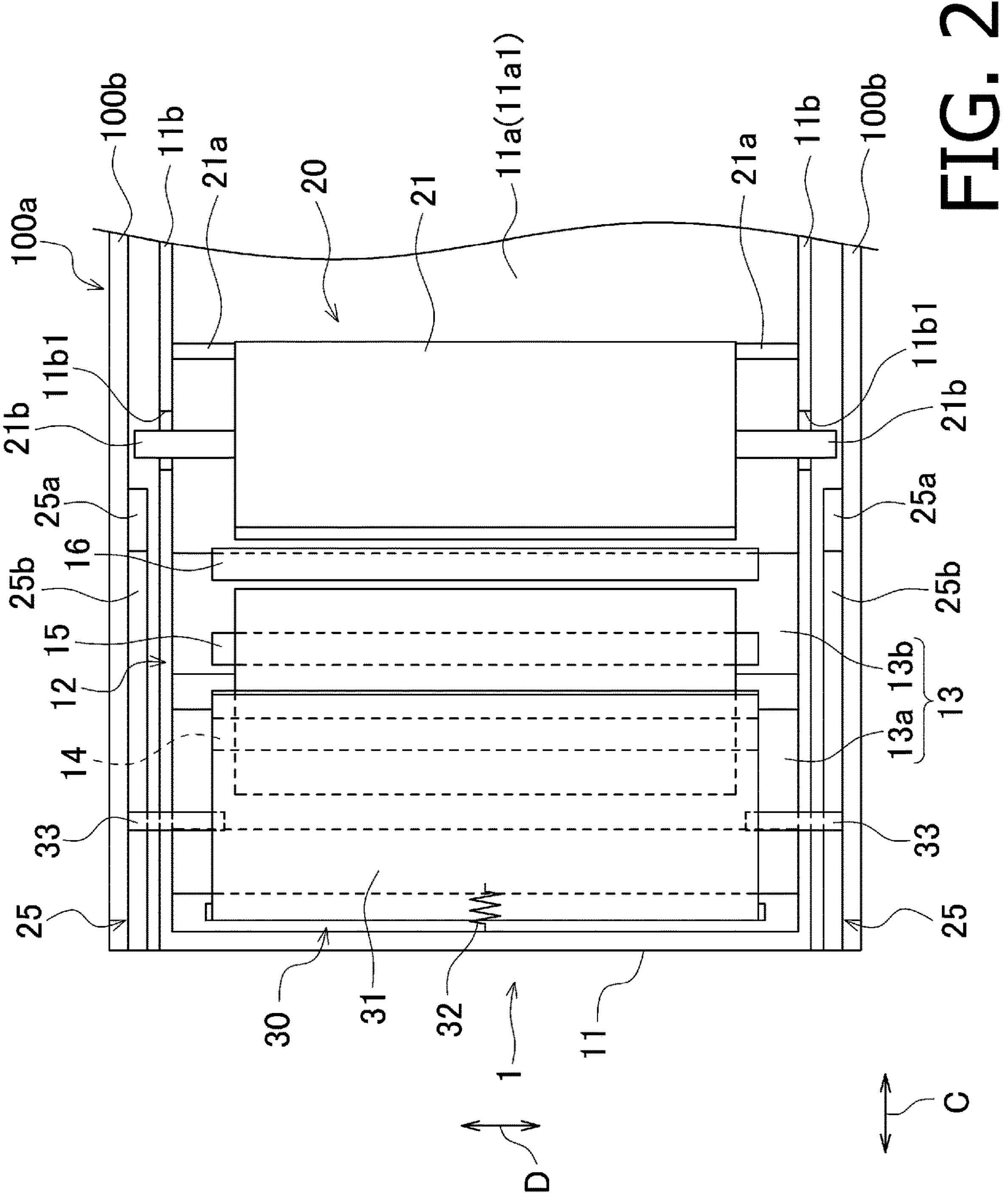
FIG. 2 is an enlarged partial plan view of the feeder unit according to the embodiment of the present disclosure.

The supporting base 13 includes, as shown in FIGS. 1-2, two (2) bases **13*a*, 13*b*. The bases 13*a*, 13*b* are spaced apart from each other in a horizontal direction C, which intersects orthogonally with the rotation axis Rx. The bases 13*a*, 13*b* are detachably attached to a bottom 11*a* of the tray 11. The bases 13*a*, 13*b* extend, as shown in FIG. 2, longitudinally along the axial direction D. The bases 13*a*, 13*b* may be formed to be substantially longer than a width of the sheet P, i.e., a width of the sheet roll R. The base 13*a* is located at a leftward position, in FIG. 1, with respect to the rotation axis Rx of the sheet roll R supported on the supporting section 12. The base 13*a* has a slope surface 13*a*1. The base 13*b* is located at a rightward position, in FIG. 1, with respect to the rotation axis Rx of the sheet roll R supported on the supporting section 12. The base 13*b* has a slope surface 13*b*1. The slope surfaces 13*a*1, 13*b*1 incline to be higher with respect to a bottom surface 11*a*1 of the tray 11 as the bases 13*a*1, 13*b*1 extend away from the rotation axis Rx in the horizontal direction C. In other words, the base 13*a* inclines to be higher toward the left in FIG. 1, and the base 13*b* inclines to be higher toward the right in FIG. 1**.

The rollers 14-16 extend longitudinally along the axial direction D, as shown in FIG. 2, to be substantially longer than the width of the sheet roll R. The roller 14 is rotatably supported by the base **13*a* to rotate about a rotation axis, which is parallel to the rotation axis Rx. The roller 14 is located at a lower position on the slope surface 13*a*1 (see FIG. 1). The roller 15 is rotatably supported by the base 13*b* to rotate about a rotation axis, which is parallel to the rotation axis Rx. The roller 15 is located at a lower position on the slope surface 13*b*1 (see FIG. 1). The roller 16 is rotatably supported by the base 13*b* to rotate about a rotation axis, which is parallel to the rotation axis Rx. The roller 16 is located at a higher position on the slope surface 13*b*1 (see FIG. 1). Among the three (3) rollers 14-16, two (2) rollers 14, 15 are arranged to contact the lower part of the outer circumferential surface of the sheet roll R and may support the sheet roll R from below. The rollers 14, 15 may contact the outer circumferential surface of the sheet roll R at supporting positions Ra1, Ra2, at which a lower end part of the sheet roll R is interposed between the rollers 14, 15, to support the sheet roll R. Optionally, the rollers 14-15** may each include a plurality of divided pieces of rollers arranged along the axial direction D.

The pullback assembly 20 includes, as shown in FIG. 2, a pivotable member 21 and two (2) engagement portions 25. The pivotable member 21 is, as shown in FIG. 1, located between the supporting base 13 and a feed roller **2*a*, which will be described further below, in the horizontal direction C. The pivotable member 21 is formed to have approximately a cross-sectional shape of an L, with one end thereof in the horizontal direction C, e.g., a leftward end in FIG. 1, being bent upward for 90 degrees. The pivotable member 21 may have a width substantially equal to the width of the sheet roll R in the axial direction D, as shown in FIG. 2. Optionally, however, the width of the pivotable member 21 may be larger or smaller in the axial direction D than the width of the sheet roll R. On the other end of the pivotable member 21 in the horizontal direction C, e.g., a rightward end in FIG. 1, two (2) shaft portions 21*a*, which extend collinearly along the axial direction D, are formed. The shaft portions 21*a* are rotatably supported by side walls 11*b*, which are formed one and the other ends of the tray 11 in the axial direction D. Therefore, the pivotable member 21 may pivot between a retracted position shown in FIG. 1 and a pushing position shown in FIG. 5B. As shown in FIG. 2, at a central position in the pivotable member 21 in the horizontal direction C, two (2) contact portions 21*b* extending collinearly along the axial direction D are formed. The contact portions 21*b* are arranged to extend through the side walls 11*b*. Meanwhile, in each of the side walls 11*b*, a cutout 11*b*1 is formed to allow the contact portions 21*b* to extend therein without contacting the side walls 11*b***.

The engagement portions 25 are, as shown in FIG. 2, arranged on the casing **100*a* at positions on outer sides of the tray 11 in the axial direction D, when the tray 11 is attached to the casing 100*a*. Each of the engagement portions 25 has a rectangular shape in the plan view shown in FIG. 2. Each engagement portion 25 extends from one end e.g., a leftward end in FIG. 1, to a center of the casing 100*a* in the horizontal direction C. As shown in FIG. 1, each engagement portion 25 has a slope surface 25*a* on a rightward end thereof. The slope surface 25*a* inclines to be higher toward one side, e.g., leftward, in a movable direction, in which the feeder cassette 1 including the tray 11 may move to be attached to or detached from the casing 100*a*. In particular, the feeder cassette 1 including the tray 11 may move in a detaching direction F (see FIG. 5) to be detached from the casing 100, and the slope surface 25*a* inclines to be higher along the detaching direction F. Each engagement portion 25 has an upper surface 25*b*, which may be a horizontally flat surface. The upper surface 25*b* is continuous with the slope surface 25*a*. The slope surface 25*a* of each engagement portion 25 and an outer end of each contact portion 21*b* are, as shown in FIGS. 1 and 2, arranged to overlap each other in the horizontal direction C. In an attached state, in which the feeder cassette 1 is attached to the casing 100*a*, as shown in FIG. 1, the engagement portions 25 and the contact portions 25*b* are spaced apart from each other in the horizontal direction C. The contact portions 21*b* are located downstream from the engagement portions 25 in an attaching direction E (see FIG. 4**B), which is a direction toward the other side, e.g., rightward, in the movable direction.

The restrictive assembly 30 includes a plate member 31, which is bent approximately in a form of a dogleg, an urging member 32, and two (2) engagement portions 33. The plate member 31 is pivotably supported by the tray 11 to pivot about a pivot shaft **31*a*. The plate member 31 may be, but not necessarily, formed to have a width larger than the width of the sheet roll R in the axial direction D, as shown in FIG. 2. The urging member 32 is, as shown in FIG. 2, arranged to urge a central part in the axial direction D of the plate member 31. The urging member 32 may be, but not necessarily be limited to, a coil spring and may be arranged to urge the plate member 31 causing the plate member 31 to pivot clockwise in FIG. 1 and approach the sheet roll R. Optionally, however, the urging member 31 may be an elastic member other than coil spring. Moreover, the urging member 32 may not necessarily be provided. If no urging member is provided, the plate member 31 may be arranged to pivot toward the sheet roll R by own weight to pivot clockwise in FIG. 1**.

Figure 5A:
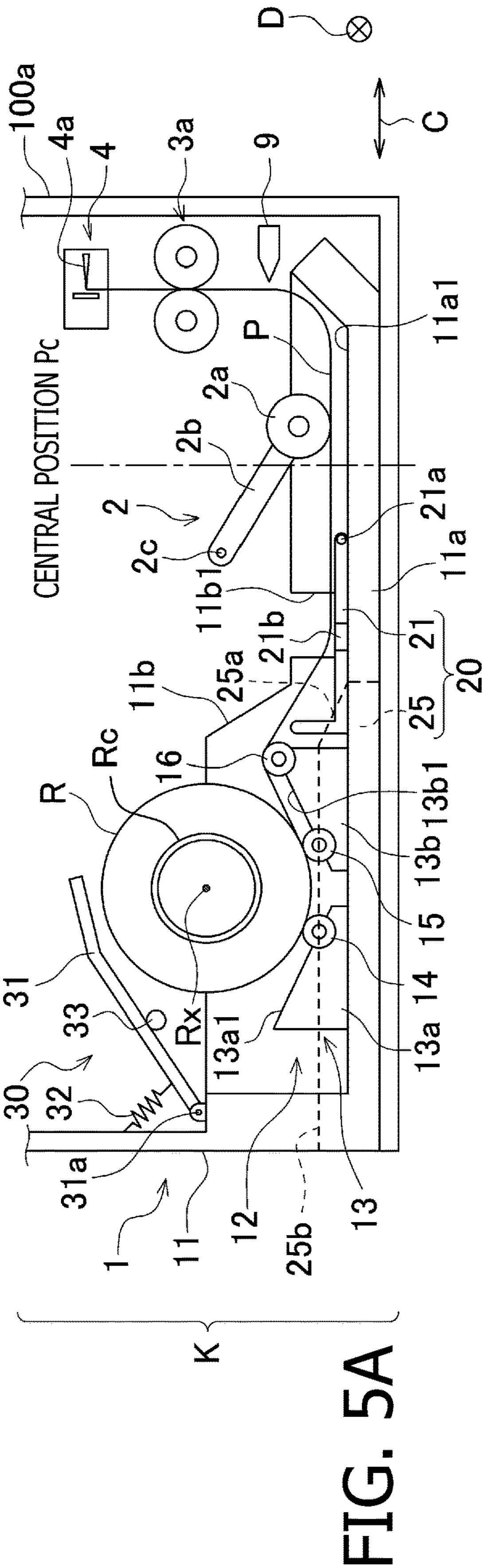
FIG. 5A is an illustrative view of the sheet roll with the sheet having been cut by a cutting device in the feeder unit according to the embodiment of the present disclosure.
Figure 5B:
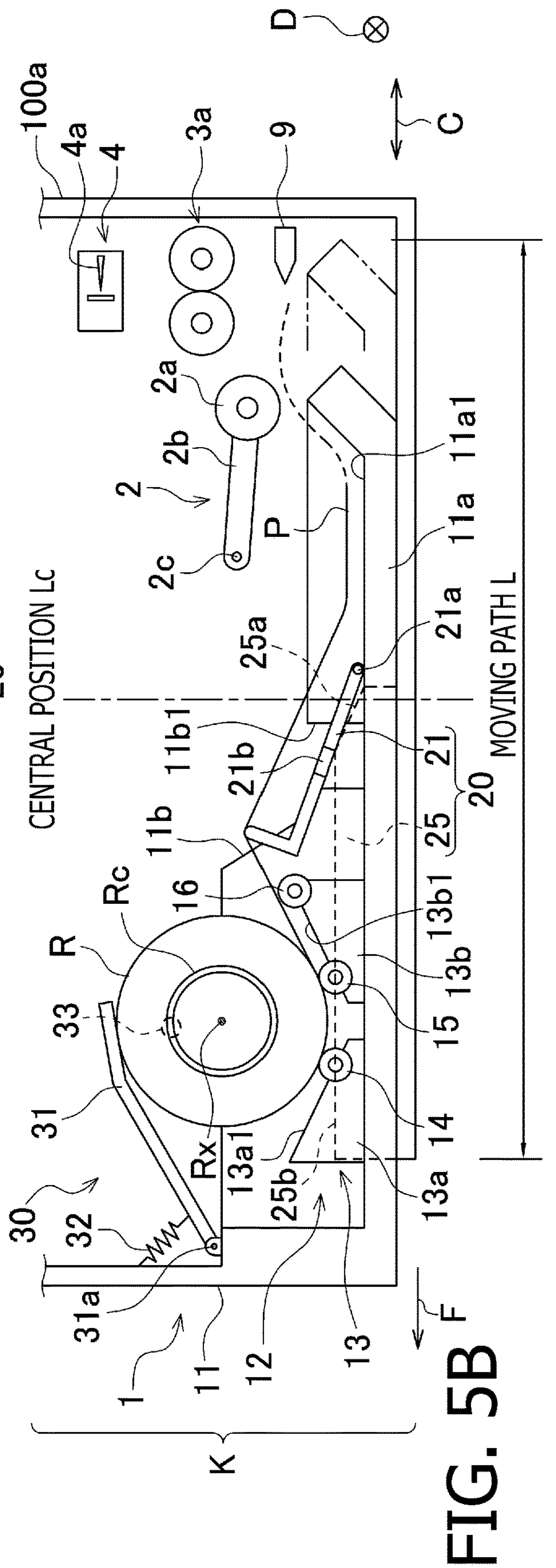
FIG. 5B is an illustrative view of the feeder cassette being detached from a casing according to the embodiment of the present disclosure.

One and the other of the engagement portions 33 are, as shown in FIG. 2, arranged on one and the other of side walls 100*b* of the casing 100*a* that face one and the other of the side walls 11*b* of the tray 11, respectively. The engagement portions 33 are formed to protrude toward each other along the axial direction D at positions higher than the side walls 11*b* of the tray 11 to face each other. The engagement portions 33 are, in the attached state where the feeder cassette 1 is attached to the casing 100*a*, located at positions, in which inward ends of the engagement portions 33 contact a surface of the plate member 31 that faces the sheet roll R, e.g., a lower surface, so that the engagement portions 33 may maintain the plate member 31 separated from the sheet roll R against the urging force by the urging member 32. The inward ends of the engagement portions 33 are located at positions, at which the engagement portions 33 do not overlap the sheet roll R in the axial direction D. In this arrangement, when the feeder cassette 1 moves to be detached from the casing 100*a*, as shown in FIG. 5B, the engagement portions 33 are separated from the plate member 31, and the plate member 31 may contact the sheet roll R to restrict the sheet roll R from rotating. Thus, the restrictive assembly 30 may shift from a state, in which rotation of the sheet roll R is not restricted, to a state, in which rotation of the sheet roll R is restricted, in conjunction with the action to detach the sheet cassette 1 including the tray 11 from the casing 100*a*. In other words, the restrictive assembly 30 may shift from a state, in which the sheet roll R is allowed to rotate without restriction, to a state, in which the sheet roll R does not rotate easily.

The engagement portions 33 are located at positions, in which, when the feeder cassette 1 is being detached from the casing 100*a*, the engagement portions 33 are separated from the plate member 31 before the contact portions 21*b* contact the engagement portions 25. In other words, the restrictive assembly 30 shifts from the state, in which rotation of the sheet roll R is not restricted, to the state, in which rotation of the sheet roll R is restricted, before the pivotable member 21 in the pullback assembly 20 pushes the sheet P upward from a lower side.

Figure 3:
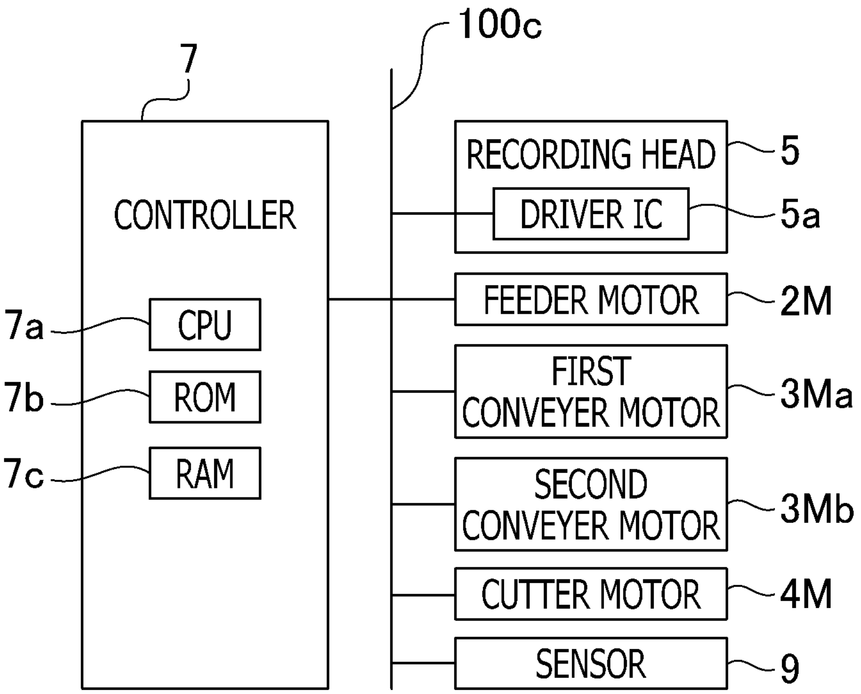
FIG. 3 is a block diagram to illustrate an electrical configuration of the printer related to the feeder unit according to the embodiment of the present disclosure.

The feeding device 2 includes, as shown in FIG. 1, a feed roller 2*a*, an arm 2*b*, a transmission assembly (not shown), and a feeder motor 2M (see FIG. 3). The feed roller 2*a* is rotatably supported by the arm 2*b* at one end of the arm 2*b* through a supporting shaft 2*c*. The transmission assembly may transmit a driving force from the feeder motor 2M to feed roller 2*a* when the feeder motor 2M is driven under a control of the controller 7. In particular, when the feeder motor 2M is driven to rotate in a normal direction, the feeder roller 2*a* may rotate in a direction to feed the sheet P to be conveyed in the conveying direction A. When the feeder motor 2M rotates in the normal direction, the transmission assembly may urge the arm 2*b* toward the bottom surface 11*a*1 of the tray 11. Therefore, the sheet P may be conveyed in the conveying direction A. On the other hand, when the feeder motor 2M is driven to rotate in a reverse direction, the arm 2*b* may pivot in a direction to separate the feed roller 2*a* from the bottom surface 11*a*1. The feed roller 2*a* separated from the bottom surface 11*a*1 may convey the sheet P neither toward the sheet roll R nor in the conveying direction A. The arm 2*b* may, when the tray 11 is being attached to or detached from the casing 100, retract to an upper position as shown in FIG. 5B.

The conveying device 3 includes, as shown in FIG. 1, three (3) conveyer roller pairs 3*a*-3*c*, a first conveyer motor 3Ma (see FIG. 3), and a second conveyer motor 3Mb (see FIG. 3). The conveyer roller pair 3*a* includes a driving roller, which may rotate by a driving force from the first conveyer motor 3Ma, and a driven roller, which may rotate passively by the rotation of the driving roller. Each of the conveyer roller pairs 3*b*, 3*c* includes a driving roller, which may rotate by a driving force from the second conveyer motor 3Mb, and a driven roller, which may rotate passively by the rotation of the driving roller. Under the control of the controller 7, the first and second conveyer motors 3Ma, 3Mb may be driven, the conveyer roller pairs 3*a*-3*c* nipping the sheet P between the driving rollers and the driven rollers may rotate to convey the sheet P.

The sensor 9 is, as shown in FIG. 1, arranged on the casing 100*a* at a position upstream from the conveyer roller pair 3*a* and downstream from the feed roller 2*a* in the conveying direction A. The sensor 9 may detect a leading end of the sheet P between the conveyer roller pair 3*a* and the feed roller 2*a* in the conveying direction A and output a detection signal to the controller 7.

The cutting device 4 is fixed to the casing 100*a* at a position above the conveyer roller pair 3*a*, as shown in FIG. 1. The cutting device 4 includes a cutter 4*a* and a cutter motor 4M (see FIG. 3) to drive the cutter 4*a*. The sheet P unrolled or drawn out from the sheet roll R may be cut by the cutter 4*a* when the cutter motor 4M is driven under the control of the controller 7. When the sheet P is cut loose by the cutter 4*a*, a rear end is formed in the loose sheet P.

The recording device 5 includes a recording head (not shown), a plurality of nozzles (not shown) formed on a lower face of the recording head, and a driver IC 5*a* (see FIG. 3). When the driver IC 5*a* is driven under the control of the controller 7, ink may be discharged through the nozzles, and an image may be recorded on the sheet P conveyed by the conveying device 3. The recording device 5 may be, for example, a line recording head, which may discharge ink through the nozzles while the recording head is fixed steadily at a position, or a serial recording head, which may discharge ink through the nozzles while the recording head is moving in the axial direction D. The sheet P, on which the image is recorded by the recording device 5, and which is cut loose by the cutter 4*a* may be received in the ejection tray 6, which is open with respect to the casing 100*a*.

The controller 7 includes a central processing unit (CPU) 7*a*, a read-only memory (ROM) 7*b*, and a random access memory (RAM) 7*c*. The ROM 7*b* may store programs and data to be used by the CPU 7*a* to control the items in the printer 100.

Next, with reference to FIGS. 4A-4B, actions to store the sheet roll R in the feeder cassette 1 and record an image on the sheet P of the sheet roll R will be described below.

Figure 4A:
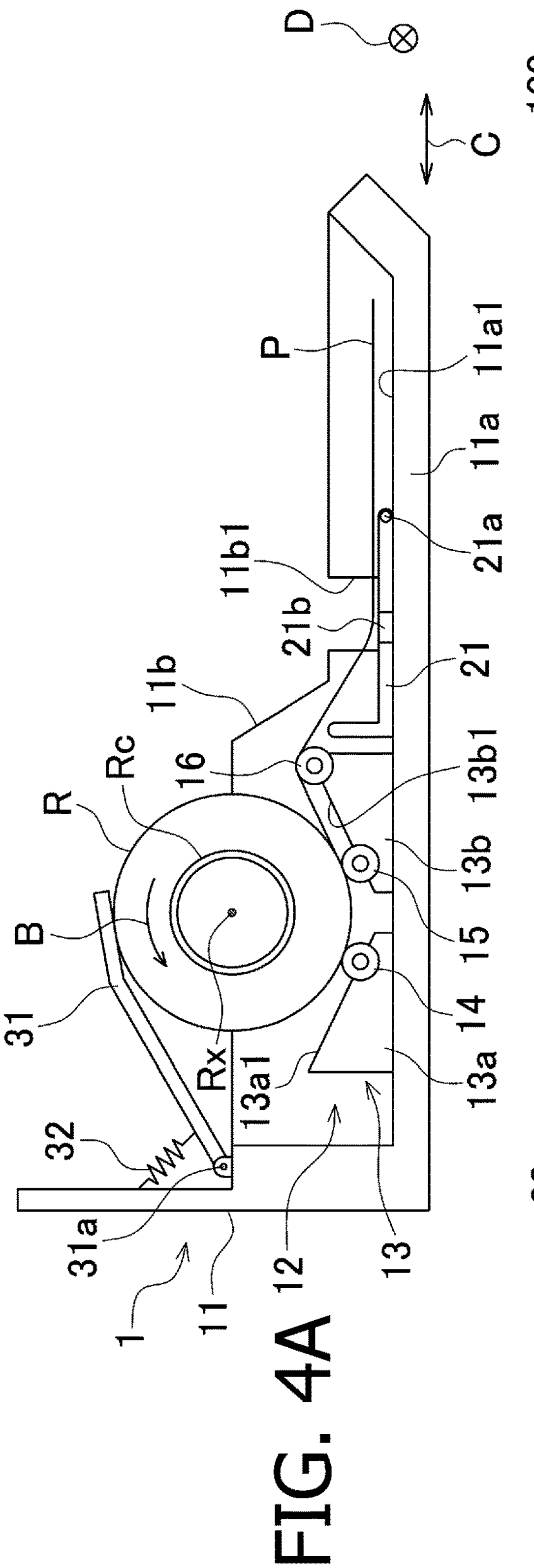
FIG. 4A is an illustrative view of a sheet roll stored in a feeder cassette in the feeder unit according to the embodiment of the present disclosure.
Figure 4B:
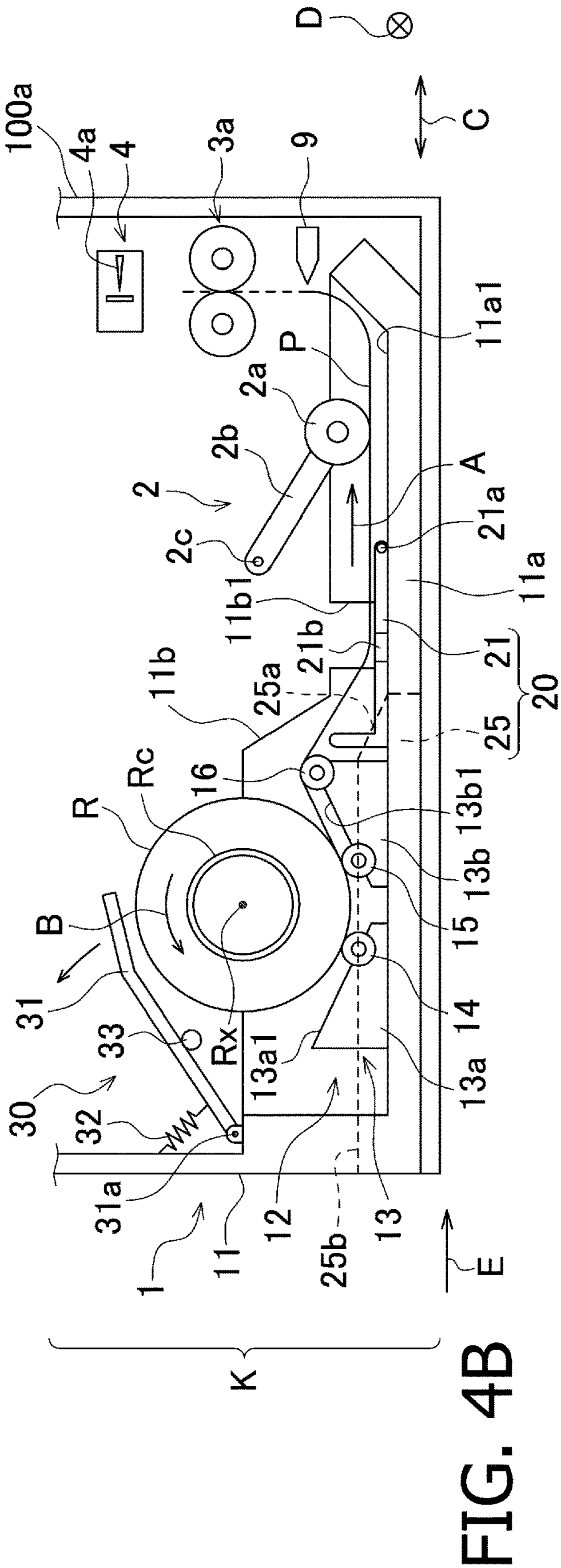
FIG. 4B is an illustrative view of a sheet being conveyed from the sheet roll in the feeder cassette in the feeder unit according to the embodiment of the present disclosure.

As shown in FIG. 4A, a user may place the sheet roll R on the rollers 14, 15 in the supporting section 12 in the feeder cassette 1 detached from the casing 100*a*. The user may rotate the sheet roll R in a direction B, in which the sheet P may be unrolled or drawn out from the sheet roll R, and place a loose end of the sheet P at a position in proximity to one end, e.g., a rightward end, of the tray 11. Thereafter, as shown in FIG. 4B, the user may move the feeder cassette

1 with the sheet roll R stored therein in the attaching direction E, which may be parallel to the horizontal direction C, to attach the feeder cassette 1 to the casing 100*a*. As the feeder cassette 1 is being moved in the attaching direction E, the plate member 31 may contact the engagement portions 33 and pivot to be separated from the sheet roll R. When the feeder cassette 1 is in the attached state, where the feeder cassette 1 is attached to the casing 100*a*, the contact portions 21*b* in the pivotable member 21 are separated from the engagement portions 25; therefore, the pivotable member 21 stays at the retracted position shown in FIG. 4B.

Thereafter, the controller 7 receiving a recording command may activate the feeder motor 2M to rotate in the normal direction. Therefore, the sheet P may be conveyed by the feed roller 2*a* in the conveying direction A. As the sheet P is drawn out from the sheet roll R, the sheet roll R may rotate, and the rollers 14, 15 that support the sheet roll R may be rotated by the rotation of the sheet roll R. When the controller 7 receives the signal indicating detection of the loose end of the sheet P from the sensor 9, the controller 7 may drive the feeder motor 2M to convey the sheet P to a position, in which the conveyer roller pair 3*a* may nip the sheet P, and stop the feeder motor 2M thereat. Thereafter, the controller 7 may drive the first and second conveyer motors 3Ma, 3Mb to rotate in the normal direction to convey the sheet P by the roller pairs 3*a*-3*b*. When the sheet P passes through a position, at which the sheet P faces the recording device 5, the controller 7 may drive the driver IC 5*a* to discharge the ink through the nozzles in the recording device 5. Thus, an image may be recorded on the sheet P. The controller 7 may stop driving the first and second conveyer motors 3Ma, 3Mb and drive the cutter motor 4M to cut the sheet P at the position of the cutter 4*a*, as shown in FIG. 1. Further, the controller 7 may drive the second conveyer motor 3Mb to convey the sheet P cut loose from the sheet roll R. If another image is to be recorded on the sheet P, the controller 7 may drive the driver IC 5*a* to cause ink to be further discharged through the nozzles in the recording device 5. The controller 7 may drive the second conveyer motor 3Mb to eject the sheet P with the image recorded thereon at the ejection tray 6 and stop driving the second conveyer motor 3Mb. The image recording action to record the image(s) on the sheet P from the sheet roll R may be completed thereat.

Next, with reference to FIGS. 5A-5B, an action to detach the feeder cassette 1 from the casing 100*a* will be described below. When the image recording action to record the image on the sheet P unrolled from the sheet roll P is completed, the loose end of the sheet P may be located at the position in the vicinity of the cutter device 4, as shown in FIG. 5A. When the sheet P is in this condition, the user may move the feeder cassette 1 for, for example, checking a remaining amount of the sheet P in the sheet roll R. In particular, the user may move the feeder cassette 1 in the detaching direction F, in which the feeder cassette 1 may be detached from the casing 100*a*, i.e., in the reverse direction from the attaching direction E. When the sheet cassette 1 is moved in the detaching direction F, the arm 2*b* may pivot upward, e.g., counterclockwise in FIG. 5B, to retract; therefore, the feed roller 2*a* may avoid interfering with the tray 11.

As the feeder cassette 1 moves further in the detaching direction F, as shown in FIG. 5B, the plate member 31 in the feeder cassette 1 may separate from the engagement portions 33 on the casing 100*a*. Therefore, the plate member 31 may pivot clockwise to contact the sheet roll R, and the sheet roll R may be restricted from rotating by the restrictive assembly 30. Meanwhile, the loose end of the sheet P may be released from the conveyer roller pair 3*a* and extend outside the tray 1, as indicated by a broken line in FIG. 5B.

While the sheet roll R is restricted from rotating by the restrictive assembly 30, and the feed cassette 1 moves further in the detaching direction F, the contact portions 21*b* in the pivotable member 21 may contact and climb the slope surface 25*a* of the engagement portion 25, causing the pivotable member 21 to pivot clockwise. As the feeder cassette 1 further moves in the detaching direction F, and when the contact portions 21*b* reach the upper surface 25*b* of the engagement portion 25, the pivotable member 21 moving from the retracted position shown in FIG. 5A may reach the pushing position shown in FIG. 5B. By the time when the pivotable member 21 reaches the pushing position, the sheet P may be pushed upward by the upright end of the pivotable member 21. With the pullback assembly 20 pushing the sheet P upward, the sheet P may curve at the part being pushed by the pivotable member 21. Accordingly, the loose end of the sheet P may be pulled back in the tray 11, as indicated by the broken line in FIG. 5B. In particular, the pullback assembly 20 is in an arrangement such that the pullback assembly 20 may pull the sheet P to locate the loose end of the sheet P at a position between a frontward end of the tray 11 in the attaching direction E and the position of the feed roller 2*a* under the condition where the tray 11 is in the attached state with respect to the casing 100*a* (see FIG. 5A). In particular, the loose end of the sheet P pulled to the position between the frontward end of the tray 11 and the position of the feed roller 2*a* under the condition where the tray 11 is in the attached state with respect to the casing 100 may be located to be lower than an upper edge of the frontward end of the tray 11.

Meanwhile, the position, at which the pullback assembly 20 pushes the sheet P upward, is located in the vicinity of the supporting section 12, in particular, closer to the sheet roll R than a central position Pc, which is between the loose end of the sheet P shown in FIG. 5A and the sheet roll R. Therefore, when the feeder cassette 1 including the tray 11 is detached from the casing 100*a*, the loose end of the sheet P may be reliably pulled back in the tray 11.

While the feeder cassette 1 including the tray 11 may shift from the attached state, in which the feeder cassette 1 is attached to the casing 100*a*, to a detached state, in which the feeder cassette 1 is detached from the casing 100*a*, the feeder cassette 1 may move with respect to the casing 100*a* for a distance in a moving path L as shown in FIG. 5B. Meanwhile, the engagement portions 25 are located at a position, in which the engagement portions 25 enable the pivotable member 21 pivoting from the retracted position to reach the pushing position by the time when the upstream end of the feeder cassette 1 in the detaching direction F reaches a central position Lc in the moving path L. In this arrangement, when the feeder cassette 1 including the tray 11 in the attached state is detached from the casing 100*a*, the loose end of the sheet P may be pulled back in the tray 11 in a relatively early timing. Therefore, while the feeder cassette 1 shifts from the attached state to the detached state, the loose end of the sheet P may be prevented from interfering with the casing 100*a* or other parts in the casing 100*a* more securely, and the sheet P may be restrained from being bent or deformed.

Moreover, as shown in FIG. 5B, while the feeder cassette 1 is shifting to the detached state, in which the feeder cassette 1 is detached from the casing 100*a*, the contact portions 21*b* in the pivotable member 21 may stay in contact with the upper surface 25*b* of the engagement portion 25, in other words, the pivotable member 21 is maintained at the pushing position. In other words, the engagement portions 25 are in an arrangement to cause the pivotable member 21 to pivot from the retracted position to the pushing position and thereafter retain the pivotable member 21 at the pushing position while the feeder cassette 1 including the tray 11 shifts from the attached state, in which the feeder cassette 1 is attached to the casing 100*a*, to the detached state, in which the feeder cassette 1 is detached from the casing 100*a*. In this arrangement, the loose end of the sheet P may be stored in the tray 11 by the time when the feeder cassette 1 completes shifting from the attached state to the detached state. If, for example, the pivotable member 21 is arranged to return from the pushing position to the retracted position by the time when the feeder cassette 1 completes shifting from the attached state to the detached state, the loose end of the sheet P may project back outside the tray 11. In contrast, according to the present embodiment, the loose end of the sheet P may stay inside the tray 11; therefore, the loose end of the sheet P may be prevented from interfering with the casing 100*a* or parts in the casing 100*a* more reliably, and the sheet P may be restrained from being bent or deformed.

Meanwhile, a user may move the feeder cassette 1 for, for example, checking a remaining amount of the sheet P in the sheet roll R. In particular, the user may move the feeder cassette 1 in the detaching direction F to visually check the condition of the sheet roll R at a position further drawn outward in the detaching direction F than the position shown in FIG. 5B but before the feeder cassette 1 is completely detached from the casing 100*a*. The user may then move the feeder cassette 1 back to be attached to the casing 100*a* from the position further drawn out but not completely detached from the casing 100*a*. During these actions by the user, the loose end of the sheet P may be substantially pulled back in the tray 11; therefore, the feeder cassette 1 may still be attached to the casing 100*a* without causing interference between the loose end of the sheet P and the feed roller 2*a* or parts in the casing 100. Moreover, when the feed cassette 1 is completely detached from the casing 100*a*, the loose end of the sheet P may securely stay inside the tray 11; therefore, the feeder cassette 1 may still be attached to the casing 100*a* without causing interference between the loose end of the sheet P and the feed roller 2*a* or the parts in the casing 100.

As described above, according to the printer 1 including the feeder unit K of the present embodiment, when the feeder cassette 1 including the tray 11 is being detached from the casing 10*a*, a part of the sheet P unrolled from the sheet roll R may be lifted upward, and the loose end of the sheet P may be pulled back in the tray 11. Therefore, when the feeder cassette 1 is attached back to the casing 100*a*, the loose end of the sheet P may be prevented from interfering with the casing 100*a* or other parts in the casing 100*a* reliably, and the sheet P may be restrained from being bent or deformed. Accordingly, a feeding error with the sheet roll R to be fed due to the actions to detach and attach the feeder cassette 1 from and to the casing 100 may be restrained.

Moreover, the pullback assembly 20 may, when the tray 11 is being detached from the casing 100, push a part of the sheet P upward to cause the loose end of the sheet P to be pulled back in the tray 11. Therefore, when the tray 11 is attached back to the casing 100*a*, the loose end of the sheet P may be prevented from interfering with the casing 100*a* or other parts in the casing 100*a*.

Moreover, when the pullback assembly 20 pushes the part of the sheet P upward, the restrictive assembly 30 may restrict the sheet roll R from rotating. While the sheet roll R is restrained from rotating, the sheet P may be restrained from being unrolled by the pushing action from the sheet roll R. Therefore, the pullback assembly 20 may pull the loose end of the sheet P inside the tray 11 reliably.

Meanwhile, the pullback assembly 20 is configured with the pivotable member 21 and the engagement portion 25. With this rather simple configuration in the pullback assembly 20, the pivotable member 21 may pivot from the retracted position to the pushing position to lift the part of the sheet P upward when the feeder cassette 1 including the tray 11 is detached from the casing 100*a*.

Moreover, the engagement portions 25 have the slope surfaces 25*a*. With this simple structure of the engagement portions 25, the pullback assembly 20 in the rather simple configuration may be provided.

Moreover, the two engagement portions 25 are located outside the tray 11, when the tray 11 is in the attached state, in which the tray 11 is attached to the casing 100*a*. Therefore, in place of the sheet roll R, the tray 11 may store cut sheets of paper. The cut sheets may be set at a position between the upright portion of the pivotable member 21, when the pivotable member 21 is at the retracted position, and a downstream end of the tray 11 in the attaching direction E. When using the cut sheets in place of the sheet roll R, optionally, the pivotable member 21 may be in an arrangement such that the upright portion is slidably movable in the horizontal direction C with respect to the horizontal portion rather than pivoting. In this arrangement, the upright portion may slide in the horizontal direction C according to a size of the cut sheets to guide edges of the cut sheets on an upstream side in the movable direction E. Optionally, moreover, resin sheets such as OHP sheets may be stored in the tray 11 to be used in place of the sheet roll P or the cut sheets of paper.

In the following paragraphs, first through fourth modified examples of the embodiment described above will be described.

Figure 6A:
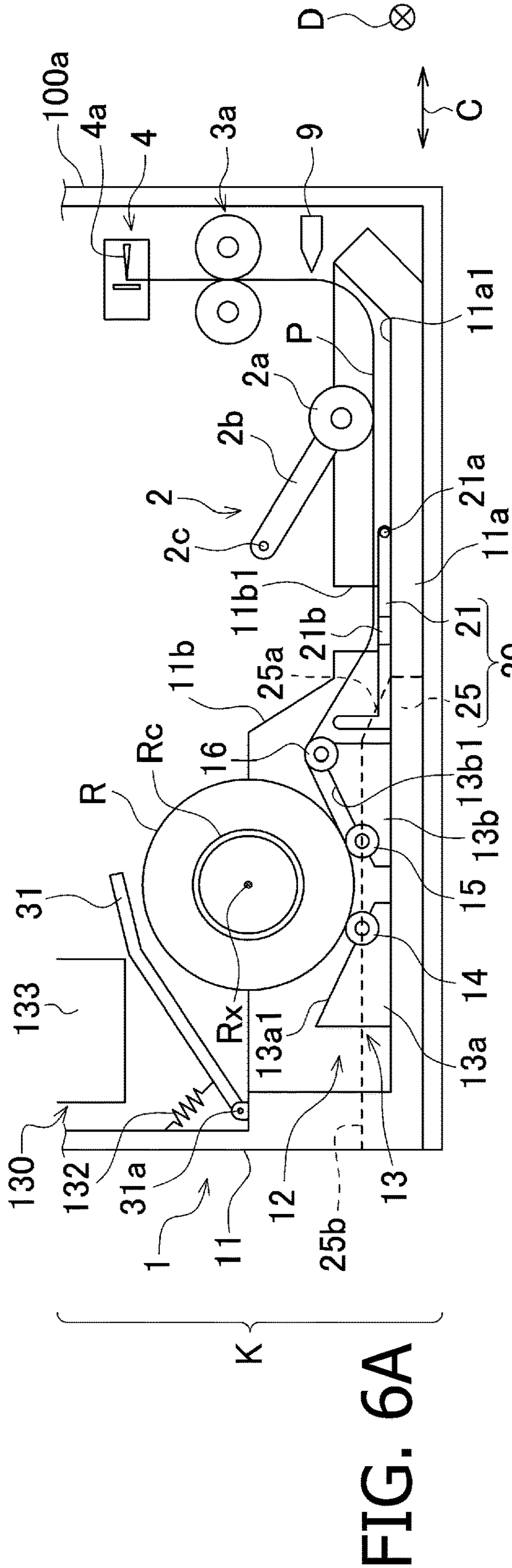
FIG. 6A is an illustrative view of a feeder unit according to a first modified example of the embodiment of the present disclosure with a sheet from a sheet roll having been cut by a cutting device.
Figure 6B:
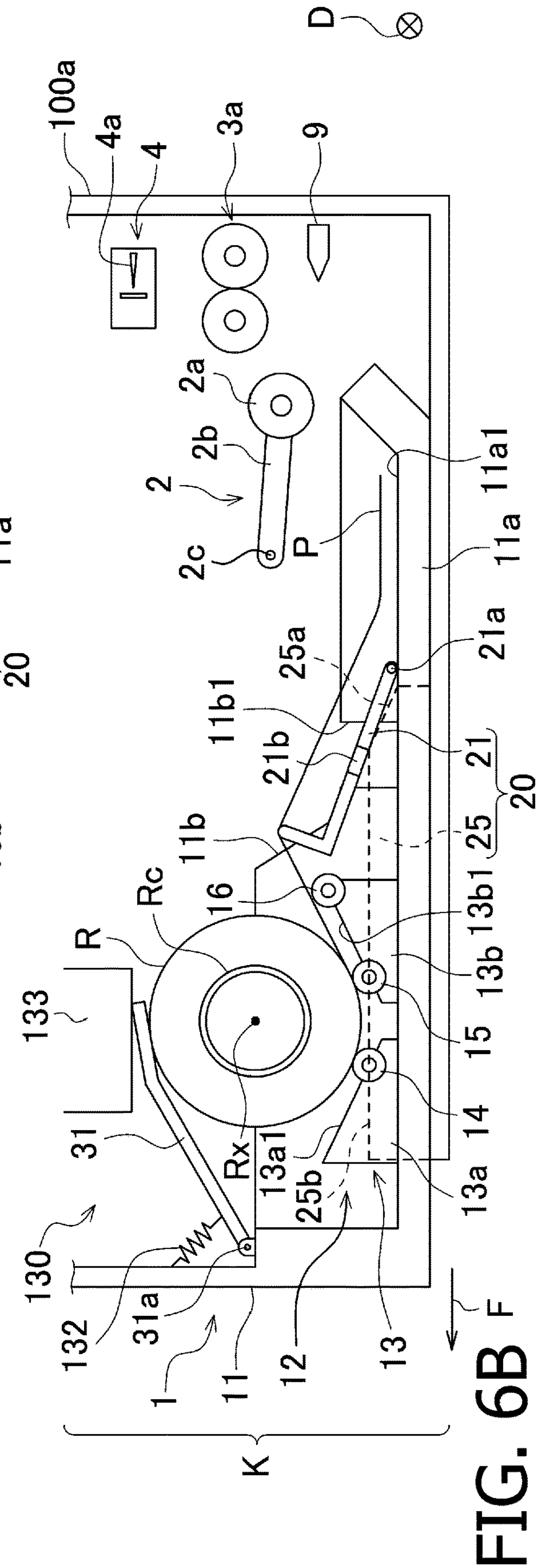
FIG. 6B is an illustrative view of the feeder unit according to the first modified example of the embodiment of the present disclosure with the feeder cassette being detached from a casing.

For the first modified example of the previous embodiment, the restrictive assembly 30 may be replaced with a restrictive assembly 130, which has a plate member 31, an elastic member 132, and an engagement portion 133, as shown in FIGS. 6A-6B. For the first modified example, items that are similar or identical to those described in the previous embodiment may be referred to by the same reference signs, and description of those will be omitted. The elastic member 132 may, when the feeder cassette 1 is in the attached state, in which the feeder cassette 1 is attached to the casing 100*a*, as shown in FIG. 6A, pull the plate member 31 to separate the plate member 31 from the tray 11 and retain thereat. The engagement portion 133 may have a rectangular-columnar shape and may be fixed to a ceiling of the casing 100*a* that defines a space in the casing 100*a*, in which the tray 11 may store the sheet roll R. The engagement portion 133 may not contact the plate member 31 when the feeder cassette 1 is in the attached state with respect to the casing 100*a* but may contact the plate member 31 while the feeder cassette 1 is moving in the detaching direction F from the position in the attached state. In particular, when the feeder cassette 1 moves with respect to the casing 100*a* in the detaching direction F, as shown in FIG. 6B, the engagement portion 133 may contact the plate member 31, causing the plate member 31 to pivot to approach and contact the sheet roll R. Therefore, the plate member 31 may restrict the sheet roll R from rotating. Meanwhile, with the restrictive assembly 130, the pullback assembly 20 may restrict rotation of the sheet roll R by the time when the pullback assembly 20 pushes the part of the sheet P upward as well as the previous embodiment described above. Therefore, the benefits achievable by the previous embodiment may as well be achievable by the first modified example of the embodiment. Meanwhile, the restrictive assembly 130 may restrict rotation of the sheet roll R at least while the contact portions 21*b* in the pivotable member 21 are in contact with the slope surfaces 25*a* of the engagement portions 25.

Optionally, the two (2) engagement portions 25 may not necessarily be located on the outer sides of the tray 11, when the feeder cassette 1 including the tray 11 is in the attached state with respect to the casing 100*a*. For example, in place of the engagement portions 25, engagement portions 250 may be arranged at positions to overlap the bottom 11*a* of the tray 11, as described in second and third modified examples below.

For the second modified example of the embodiment described above, the two (2) engagement portions 250 may be located at positions by the side walls 11*b* of the tray 11, in particular, on an inner side of each side wall 11*b*, to overlap end areas at the bottom 11*a* in the axial direction D, as shown in FIGS. 7A-7B. For the second modified example, items that are similar or identical to those described in the embodiment may be referred to by the same reference signs, and description of those will be omitted. In the areas at the bottom 11*a* that overlap the engagement portions 250 in the axial direction D, formed are two (2) cutouts 260 to allow upper ends of the engagement portions 250 to protrude upward through the bottom surface 11*a*1 when the tray 11 is attached to the casing 100*a*. The cutouts 260 are formed to extend along the detaching direction F from an upstream end of the tray 11 in the detaching direction F, and downstream ends of the cutouts 260 in the detaching direction F are located substantially downstream in the detaching direction F from the engagement portions 250. Meanwhile, the pivotable member 21 is pivotably supported at an upstream end thereof in the detaching direction F by two (2) supporting flanges 11*a*2, which are formed on the bottom surface 11*a*.

The engagement portions 250 may be substantially in the same form as the engagement portions 25 described above, except that a dimension thereof in the horizontal direction C is smaller than the dimension of the engagement portions 25 in the horizontal direction C. Each engagement portion 250 has a slope surface 250*a*, which is substantially similar to the slope surface 25*a*, and a downstream end of the engagement portion 250 in the detaching direction F is located at the same position as a downstream end of the slope surface 250*a* in the detaching direction F. In this arrangement, the dimension of the cutouts 260 in the horizontal direction C may be shortened.

Meanwhile, as shown in FIG. 7A, the contact portions 21*b* to contact the engagement portions 250 is formed to be smaller in the axial direction D to be stored in the tray 11. Therefore, the cutouts 11*b*1 on the side walls 11*b* may be eliminated from the tray 11. Moreover, with the engagement portions 250 arranged at the positions to overlap the bottom 11*a* of the tray 11, a dimension of the casing 100*a* in the axial direction D may be reduced. Therefore, the side walls 100*b* of the casing 100*a* may be arranged to be closer to the side walls 11*b* of the tray 11.

According to the second modified example, when the tray 11 moves in the detaching direction F from the position shown in FIG. 7A, in which the tray 11 is in the attached state with respect to the casing 100*a*, the slope surfaces 250 of the engagement portions 250 may contact the contact portions 21*b* as shown in FIG. 7B, and the pivotable member 21 may lift a part of the sheet P upward. Therefore, similarly to the embodiment described earlier, the loose end of the sheet P may be prevented from interfering with the casing 100*a* or other parts in the casing 100*a*, and the sheet P may be restrained from being bent or deformed.

Moreover, the engagement portions 250 are located at the end areas in the tray 11 in the axial direction D when the tray 11 is in the attached state with respect to the casing 100*a*. Therefore, the tray 11 may store cut sheets, in other words, loose sheet media, as well as the embodiment described earlier.

For the third modified example of the embodiment, a single engagement portion 250 may be arranged at a position to overlap a center of the bottom 11*a* in the axial direction D, as shown in FIGS. 8A-8B. For the third modified example, items that are similar or identical to those in the embodiment and the modified example described earlier may be referred to by the same reference signs, and description of those will be omitted. A single cutout 260 may be formed at a position to overlap the center of the bottom 11*a* in the axil direction D. With the single cutout 260 formed at the center of the bottom 11*a* in the axial direction D alone, rigidity of the tray 11 may be improved.

As shown in FIGS. 8A-8B, a pivotable member 210 may have a contact portion 210*b* to contact the engagement portion 250 at a center of the pivotable member 210 in the axial direction D. In particular, the pivotable member 210 is formed to have two (2) cutouts 211, 212 at both ends in the horizontal direction D, and the contact portion 210*b* is formed between the cutouts 211, 212.

According to the third modified example, when the tray 11 moves in the detaching direction F from the position shown in FIG. 8A, in which the tray 11 is in the attached state with respect to the casing 100*a*, the slope surfaces 250*a* of the engagement portion 250 may contact the contact portion 210*b*, as shown in FIG. 8B, and the pivotable member 210 may lift a part of the sheet P upward. Therefore, similarly to the embodiment and the modified examples described earlier, the loose end of the sheet P may be prevented from interfering with the casing 100*a* or other parts in the casing 100*a*, and the sheet P may be restrained from being bent or deformed.

For the fourth modified example of the embodiment, the engagement portions 25 may be located at positions, in which the engagement portions 25 may move the pivotable member 21 to start pivoting from the retracted position to the pushing position after the upstream end of the feeder cassette 1 moving in the detaching direction F passes beyond the central position Lc in the moving path L. In this arrangement, the slope surfaces 25*a* of the engagement portions 25 may be located at a position downstream with respect to the position of the slope surfaces 25*a* in the embodiment described earlier. Even in this arrangement, similarly to the embodiment described earlier, the loose end of the sheet P may be prevented from interfering with the casing 100*a* or other parts in the casing 100*a*, and the sheet P may be restrained from being bent or deformed.

Although examples of carrying out the invention have been described, those skilled in the art will appreciate that there are numerous variations and permutations of the medium unit that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the pullback assembly 20 may not necessarily push the sheet P upward at the position closer to the sheet roll R than the central position Pc but may push the sheet P at a position farther from the sheet roll R than the central position Pc, as long as the loose end of the sheet P may be pulled toward the sheet roll R by the pushing action.

For another example, the pullback assembly 20 may not necessarily push the part of the sheet P to cause the loose end of the sheet P to be pulled completely back in the tray 11 when the tray 11 is detached from the casing 100*a*, but the loose end of the sheet P may project outside the tray 11 to some extent, as long as the loose end of the sheet P is pulled back toward the tray 11 for a least amount by the pushing action of the pullback assembly 20. With the loose end of the sheet P pulled back toward the tray 11, the loose end of the sheet P may be restrained from interfering with the casing 100*a* or other parts in the casing 100*a*, and the sheet P may be restrained from being bent or deformed. Thus, the benefits achievable by the previous embodiment may be substantially achievable.

For another example, the pullback assembly 20 may have a slider member, which may slide vertically, in place of the pivotable member 21. The slidable member may move between a retracted position, which is lower, and a pushing position, which is higher to push a part of the sheet P as well as the pivotable member 21. In this arrangement, the benefits achievable by the embodiment described above may be achieved. For another example, the pivotable member 21 may not necessarily have the pivot axis at the upstream end thereof in the detaching direction F to move the upstream end thereof vertically but may have a pivot axis at the downstream end thereof in the detaching direction F to move at the upstream end thereof vertically. For another example, the pivotable member 21 may have a pivot axis at one end thereof in the axial direction D to move at the other end thereof in the axial direction D vertically. In these arrangements, the benefits achievable by the previous embodiment may be substantially achievable.

For another example, the pivotable member 21 may not necessarily be moved to pivot by the contact between the contact portions 21*b* and the engagement portions 25. For example, a pinion gear may be fixed to an end of one of the shaft portions 21*a* in the pivotable member 21, and the casing 100*a* may have a rack gear. The pinion gear may mesh with the rack gear and cause the pivotable member 21 to move from the retracted position to the pushing position as the tray 11 moves in the detaching direction F. In this arrangement, the pivotable member 21 may have the pivot axis at the downstream end thereof in the detaching direction F to move at the upstream end thereof vertically. For another example, the engagement portions 25 or 250 described earlier may be formed of plate members having smaller dimensions in the axial direction D. For another example, the restrictive assembly 30 may be omitted.

For another example, the sheet roll R may not necessarily have the tubular member Rc at the core as long as the sheet P is rolled rotatably. For another example, a shaft member may be placed in the tubular member Rc to support the sheet roll R rotatably. For another example, the feeder unit K may be arranged as an extension unit detachably attached to a lower position in the casing 100*a*. With the extension feeder unit, the benefits achievable by the previous embodiment may be substantially achievable. The present disclosure may be applied generally to a medium unit that may accommodate a sheet roll R.

What is claimed is:

1. A medium unit, comprising:
- a tray configured to store a roll of medium, in which a continuous medium is rolled;
- a casing configured to support the tray movably; and
- an assembly configured to move the continuous medium unrolled from the roll of medium in conjunction with an outward movement of the tray with respect to the casing to pull a loose end of the continuous medium back toward the tray.

2. The medium unit according to claim 1, wherein the assembly is configured to push the continuous medium from below to locate the loose end of the continuous medium at a position lower than an upper edge of a frontward portion of the tray in a direction to move the tray into the casing.

3. The medium unit according to claim 1, wherein the assembly is configured to push a part of the continuous medium from below at a position closer to the roll of medium than a central position between the loose end of the continuous medium unrolled from the roll of medium and the roll of medium.

4. The medium unit according to claim 1, wherein the assembly is configured to push the continuous medium from below to pull the loose end of the continuous medium, and
- wherein the medium unit further comprises a restrictive assembly configured to restrict rotation of the roll of medium in conjunction with the outward movement before the assembly pushes the continuous medium.

5. The medium unit according to claim 1, wherein the assembly is configured to push the continuous medium from below to pull the loose end of the continuous medium, and
- wherein the assembly includes:
  - a pivotable member pivotably supported by the tray, the pivotable member being configured to pivot between a first position and a second position, in which an end of the pivotable member is higher than the end of the pivotable member in the first position; and
  - an engagement portion arranged on the casing, the engagement portion being configured to engage with the pivotable member and cause the pivotable member to pivot from the first position to the second position in conjunction with the tray being moved in the outward movement.

6. The medium unit according to claim 5, wherein the engagement portion has a slope surface configured to cause the pivotable member to pivot by contacting the pivotable member, and
- wherein the slope surface inclines to be higher along a moving direction, in which the tray is moved outward from the casing in the outward movement.

7. The medium unit according to claim 5, wherein the engagement portion is located at a position, at which the engagement portion is causable the pivotable member to pivot from the first position to the second position before the tray reaches a central position in a moving path, in which the tray is movable with respect to the casing in the outward movement.

8. The medium unit according to claim 7, wherein the engagement portion is configured to cause the pivotable member to pivot to the second position from the first position and retain the pivotable member at the second position until the tray reaches outside of the casing.

* * * * *